(12) United States Patent
Ohkawara et al.

(10) Patent No.: US 6,720,938 B2
(45) Date of Patent: Apr. 13, 2004

(54) HEAD-UP DISPLAY ON A VEHICLE, WITH CONTROLLED BRIGHTNESS OF WARNING LIGHT

(75) Inventors: Osamu Ohkawara, Saitama-ken (JP); Masashi Satomura, Saitama-ken (JP); Hiroshi Hattori, Saitama-ken (JP); Takayuki Tsuji, Saitama-ken (JP); Ken Asami, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/850,243

(22) Filed: May 7, 2001

(65) Prior Publication Data

US 2001/0040534 A1 Nov. 15, 2001

(30) Foreign Application Priority Data

May 9, 2000 (JP) .......................... 2000-136183

(51) Int. Cl.[7] .................................. G09G 5/00
(52) U.S. Cl. .................. 345/7; 345/9; 340/903; 340/937; 359/630
(58) Field of Search .................. 345/7–9; 359/13, 359/629–631; 340/435, 903, 907

(56) References Cited

U.S. PATENT DOCUMENTS

| | | | | |
|---|---|---|---|---|
| 5,313,201 A | * | 5/1994 | Ryan | 340/961 |
| 5,497,271 A | * | 3/1996 | Mulvanny et al. | 359/631 |
| 5,710,668 A | * | 1/1998 | Gohman et al. | 359/634 |
| 5,854,617 A | * | 12/1998 | Lee et al. | 345/102 |
| 6,278,425 B1 | * | 8/2001 | DeLuca | 345/84 |
| 6,292,111 B1 | * | 9/2001 | Ishikawa et al. | 340/937 |
| 6,396,397 B1 | * | 5/2002 | Bos et al. | 340/461 |
| 6,411,328 B1 | * | 6/2002 | Franke et al. | 348/149 |

FOREIGN PATENT DOCUMENTS

JP 09-226490 9/1997

* cited by examiner

Primary Examiner—Kent Chang
Assistant Examiner—Tom Sheng
(74) Attorney, Agent, or Firm—Carrier, Blackman & Associates, P.C.; Joseph P. Carrier; William D. Blackman

(57) ABSTRACT

A head-up display on a vehicle, which calls the attention of the driver or passenger to a dangerous object and makes the driver or passenger reliably recognize a communicated alarm, comprises: an image display device for displaying an image taken by a camera; a detecting device for detecting a target object; a switching device for manually switching between a display state and a warm-up state; and a warning device for outputting a control signal based on the detected result, thereby making the image display device display the image. The brightness for displaying the image according to the control signal is higher than the brightness for displaying the image according to a manual operation of the switching device.

7 Claims, 12 Drawing Sheets

Fig. 16B
ALARM INDICATING PERIPHERAL VEHICLE
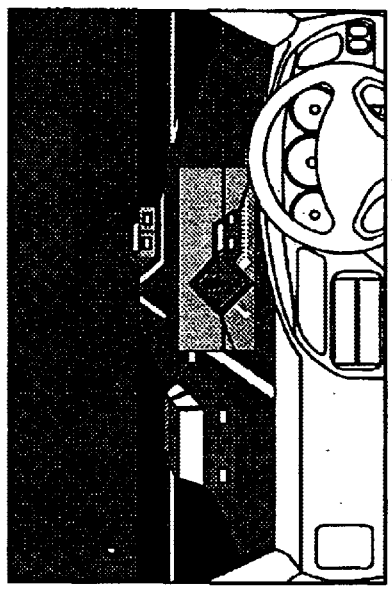
Fig. 16C
DISPLAY BOTH IMAGES OF FIGS. 16A AND 16B
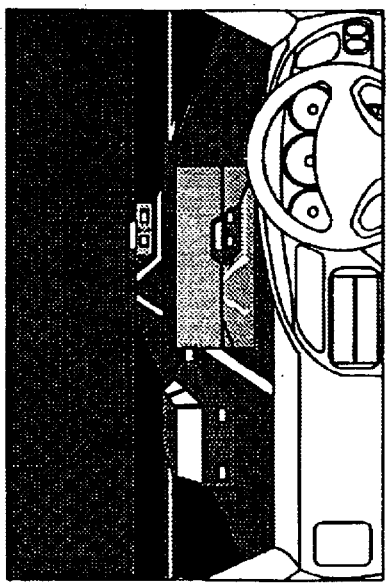
Fig. 16A
IMAGE TAKEN BY IR CAMERA

HEAD-UP DISPLAY ON A VEHICLE, WITH CONTROLLED BRIGHTNESS OF WARNING LIGHT

BACKGROUND OF THE INVENTION

1. Field of the Invention

The present invention relates to a head-up display on a vehicle, and in particular, to a technique of controlling the brightness of a displayed image.

2. Description of the Related Art

Conventionally, a system on a vehicle for detecting a pedestrian or the like ahead of the vehicle is known, wherein two cameras are mounted on the vehicle, and the distance between the target object and the vehicle is determined based on the difference between the images taken by the two cameras, that is, by using parallax. Japanese Unexamined Patent Application, First Publication, No. Hei 9-226490 discloses a detector for crossing objects, which is an example of the above-explained system.

In such conventional systems, typically, the driver is warned of the existence of a target object with which the vehicle may collide by only an alarm mounted on the vehicle. Therefore, if the driver specifies or identifies the wrong object as the target object, the message of the alarm will not be correctly communicated to the driver.

SUMMARY OF THE INVENTION

In consideration of the above circumstances, an objective of the present invention is to provide a head-up display on a vehicle for calling the attention of the driver or passenger to a dangerous object and for making the driver or passenger reliably recognize a communicated alarm.

Therefore, the present invention provides a head-up display on a vehicle (e.g., vehicle 1 in the embodiment explained below), comprising:

- an image display device (e.g., HUD control section 31 and HUD body 32 in the embodiment explained below) for displaying an image taken by a camera (e.g., IR camera 11R or 11L in the embodiment explained below) on the vehicle;
- a detecting device (e.g., night vision unit 33 and peripheral vehicle recognizing unit 34 in the embodiment explained below) for detecting a target object in the vicinity of the vehicle;
- a switching device (e.g., display start/stop operating section 12 in the embodiment explained below) for manually switching between a display state in which the image is displayed by the image display device and a warm-up state in which the image is invisible; and
- a warning device (e.g., night vision unit 33 (which also functions as the above detecting device) in the embodiment explained below) for outputting a control signal based on a result detected by the detecting device, thereby making the image display device display the image, and
- wherein a brightness employed by the image display device for displaying the image according to the control signal is higher than a brightness employed by the image display device for displaying the image according to a manual operation of the switching device.

According to the above structure, typically, the head-up display is activated and switched on when the vehicle is started by switching on the ignition, and the head-up display enters the warm-up state. After that, if a target object which seems like it will collide with the vehicle is detected based on an image taken by the camera or by a peripheral vehicle recognizing unit or the like, or if a manual operation of the switching device is performed by the driver who wishes to confirm an image, then the image taken by the camera is displayed in an image display area on a front window, or the like. Here, the brightness employed by the image display device for displaying the image according to the control signal is higher than the brightness employed by the image display device for displaying the image according to the manual operation of the switching device. Therefore, the driver can be reliably informed of the relevant alarm.

That is, when the driver (or passenger) manually commands the image display by using the switching device, it is determined that the driver wishes to confirm a dangerous situation or the like. On the other hand, when the image is displayed according to the control signal output from the warning device, the driver does not expect the output of a control signal (that is, an alarm). However, in this case, the image is displayed with a higher brightness, thereby reliably attracting the driver's attention, and preventing the driver from erroneously recognizing the target object.

Preferably, when the image display device displays the image according to the control signal from the warning device, the image display device reduces the brightness after a predetermined time (e.g., $t_2-t_1$ or $t_3-t_1$ in the embodiment explained below) from the starting of the display. Accordingly, when a control signal is again output, the brightness of the displayed image can be increased again, thereby making the driver or passenger reliably recognize the alarm relating to this control signal.

Typically, in the warm-up state, the image is displayed with a brightness by which the image is invisible to the driver or passenger of the vehicle; and when a predetermined time (e.g., $t_4-t_1$ in the embodiment explained below) has elapsed after the image display device starts to display the image, the display state is shifted to the warm-up state.

Accordingly, during ordinary driving, the driver's vision is not obstructed by the image displayed on the front window, for example, and when the control signal is output, the brightness of the image can be quickly increased, thereby reducing the time lag from the command to the display start, and making the driver or passenger reliably recognize the relevant alarm.

Preferably, the image display device has a light source (e.g., light source 21 in the embodiment explained below) for changing the brightness of the displayed image according to an applied voltage supplied to the light source; and when the image display device is commanded to display the image by a manual operation of the switching device or the control signal output from the warning device, the image display device supplies the maximum applied voltage (e.g., $V_f$ in the embodiment explained below) to be applied to the light source for a predetermined time (e.g., $t_f-t_1$ in the embodiment explained below).

Accordingly, when the starting of the image display (i.e., display state) is commanded, even when the applied voltage corresponding to a target brightness is lower than the maximum applied voltage to be supplied to the light source, the maximum applied voltage is temporarily supplied, and the applied voltage corresponding to the target brightness can be employed when the brightness reaches the target brightness. Therefore, the time necessary for the light source to reach the target brightness can be reduced, thereby improving the response of the image display operation, and making the driver or passenger quickly recognize the relevant alarm.

It is possible that the detecting device outputs an alarm signal when detecting a target object in the vicinity of the vehicle; and the image display device displays a predetermined still image according to the alarm signal output from the detecting device, and wherein the brightness employed by the image display device for displaying the still image according to the alarm signal is higher than the brightness employed by the image display device for displaying the image according to a manual operation of the switching device.

Preferably, when the image display device displays the still image according to the alarm signal from the detecting device, the image display device reduces the brightness after a predetermined time from the starting of the display.

It is also possible that when both the control signal from the warning device and the alarm signal from the detecting device are output, the image display device displays the image taken by the camera and the still image which are overlapped.

BRIEF DESCRIPTION OF THE DRAWINGS

FIGS. 16A to 16C are views showing steps of displaying each image using an image signal and/or warning still-image data, that is, a variation of the displayed image.

DESCRIPTION OF THE PREFERRED EMBODIMENTS

Hereinafter, embodiments of the vehicle head-up display (i.e., a head-up display on a vehicle) according to the present invention will be explained with reference to the drawings.

Figure 1:
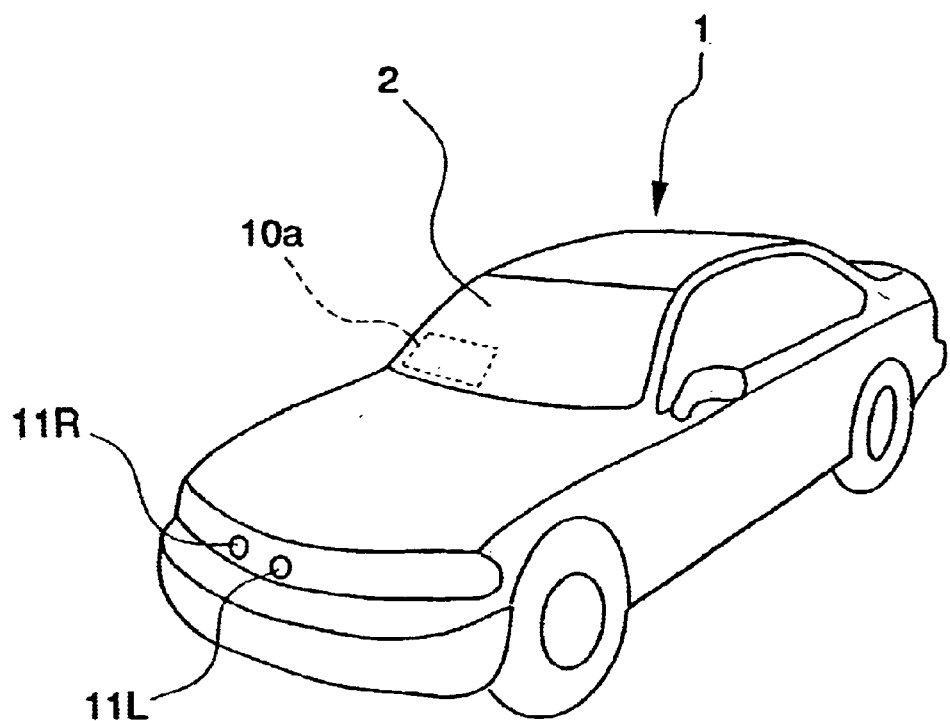
FIG. 1 is a perspective view showing a vehicle on which a head-up display, as an embodiment of the present invention, is mounted.
Figure 2:
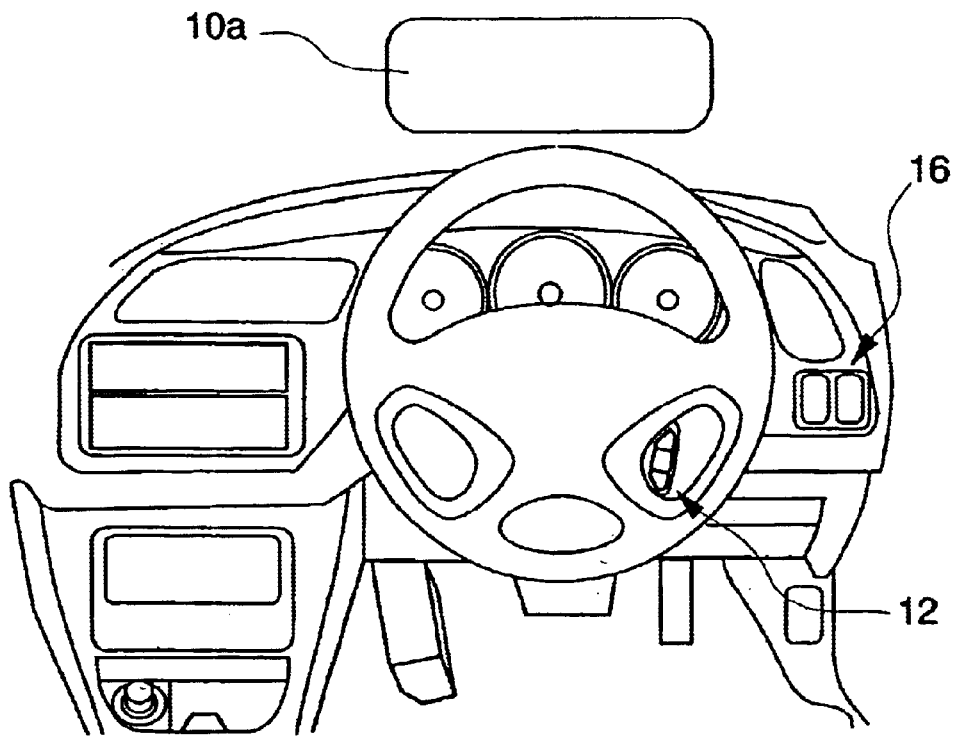
FIG. 2 shows a view of the interior of the vehicle, and in particular, shows an image display area of the vehicle head-up display shown in FIG. 1.
Figure 3:
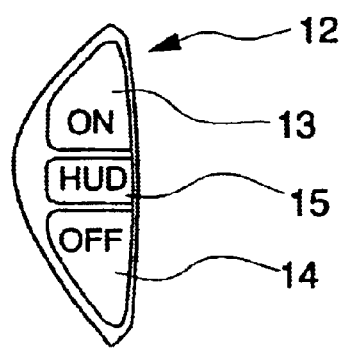
FIG. 3 is a diagram showing a display start/stop operating section of the vehicle head-up display shown in FIG. 2.
Figure 4:
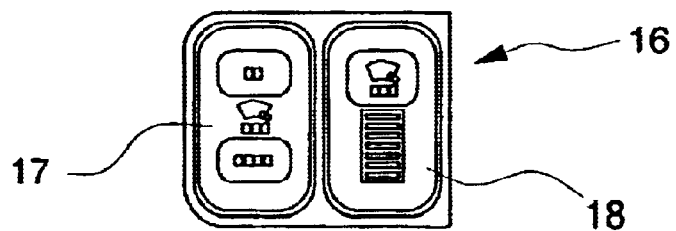
FIG. 4 is a diagram showing a control and operating section of the vehicle head-up display shown in FIG. 2.
Figure 5:
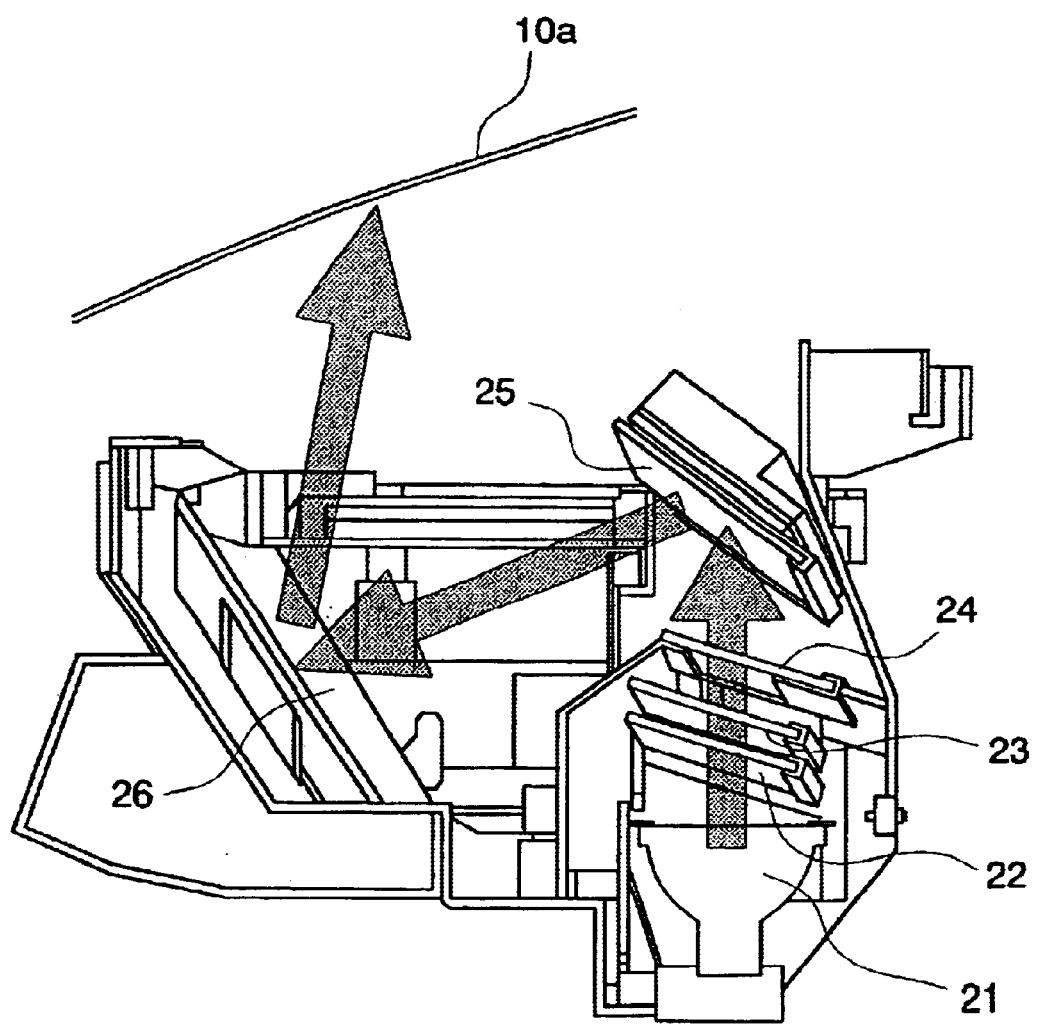
FIG. 5 is a cross-sectional side view showing the structure of the vehicle head-up display.
Figure 6:
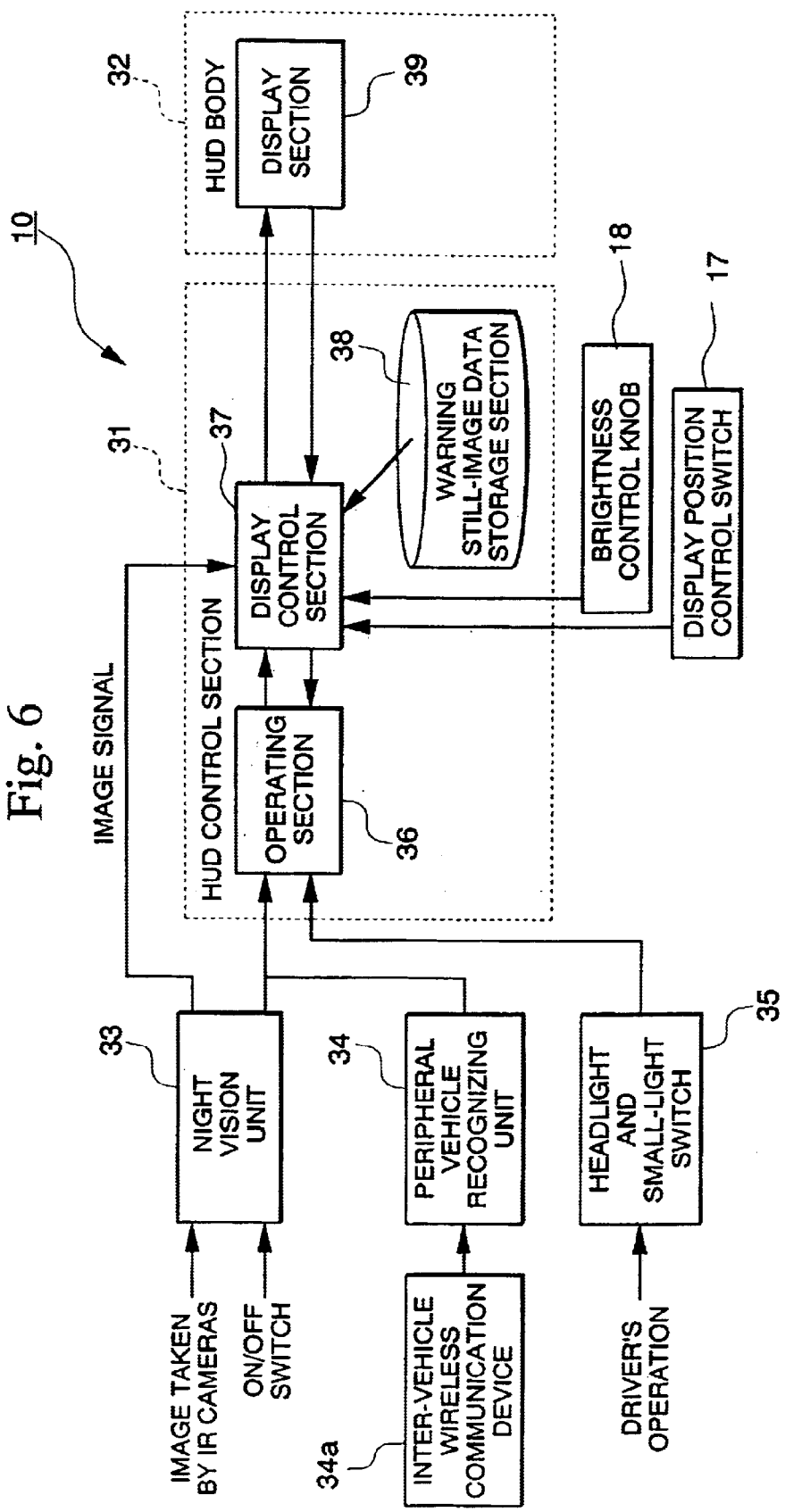
FIG. 6 is a block diagram of the structure of the vehicle head-up display shown in FIG. 5.
Figure 7:
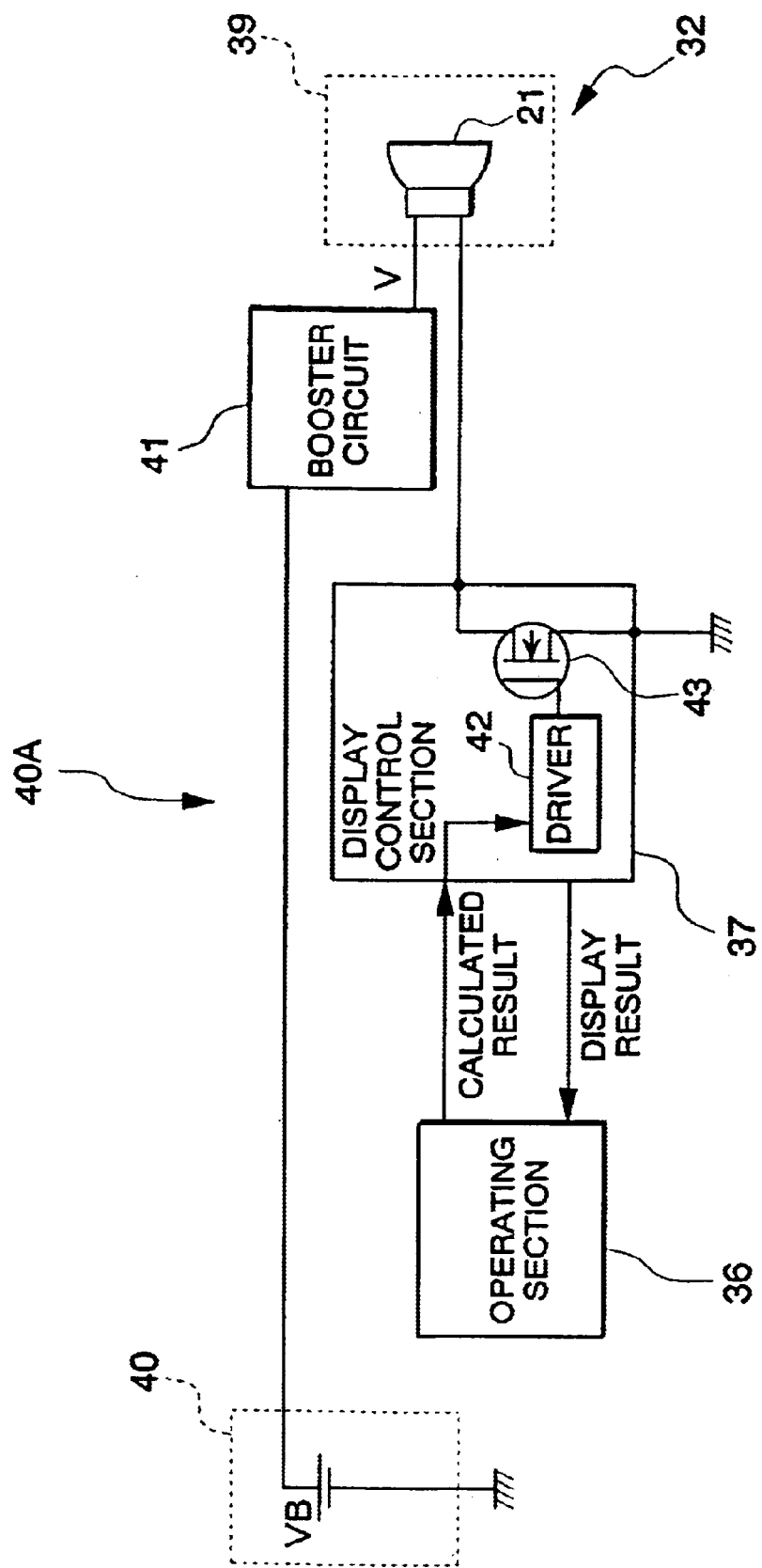
FIG. 7 is a block diagram showing the structure of a source voltage supply section provided for a display section in FIG. 6.
Figure 8A:
FIG. 8A is a graph showing a waveform of a drive voltage using a pulse sequence for driving and controlling a switching element.
Figure 8B:
FIG. 8B is a graph showing a waveform of an applied voltage supplied to a light source.

FIG. 1 is a perspective view showing a vehicle 1 on which a vehicle head-up display 10, as an embodiment of the present invention, is mounted. FIG. 2 shows a view of the interior of the vehicle, and in particular, shows an image display area 10a of the vehicle head-up display 10. FIG. 3 is a diagram showing a display start/stop operating section 12 of the vehicle head-up display 10 shown in FIG. 2. FIG. 4 is a diagram showing a control and operating section 16 of the vehicle head-up display 10 shown in FIG. 2. FIG. 5 is a cross-sectional side view showing the structure of the vehicle head-up display 10. FIG. 6 is a block diagram of the structure of the vehicle head-up display 10. FIG. 7 is a block diagram showing the structure of a source voltage supply section 40A provided for a display section 39 in FIG. 6. FIG. 8A is a graph showing a waveform of a drive voltage using a pulse sequence for driving and controlling a switching element 43, and FIG. 8B is a graph showing a waveform of an applied voltage supplied to a light source 21.

As shown in FIG. 1, in the vehicle head-up display 10 of the present embodiment, images taken by, for example, two IR (infrared) cameras 11R and 11L are projected onto a front window 2 of the vehicle 1. The IR cameras 11R and 11L are attached to the front portion of the vehicle 1, and can detect infrared rays.

More specifically, the two IR cameras 11R and 11L are attached on the head portion of the vehicle 1, so as to be almost symmetrically positioned with respect to a crosswise center axis of the vehicle (see FIG. 1). In addition, the heights of each camera from the ground are substantially the same, so that the optical axes of the IR cameras 11R and 11L are parallel to each other.

Due to the characteristics of the IR cameras 11R and 11L, the higher the temperature of a target object (for image-taking), the higher the level of the output signal from each camera, that is, the greater the brightness.

As shown in FIG. 2, the display start/stop operating section 12 for manually designating the start and stop timing of the display operation of the vehicle head-up display 10 is attached to the steering wheel of the vehicle 1. Typically, the display start/stop operating section 12 has a display start button 13 and a display stop button 14, and each is manually pushed by the driver to control the display ON/OFF (i.e., start/stop) timing. Here, a protruding portion 15 is provided between the display start button 13 and stop button 14 in order to separate the two buttons. Accordingly, an erroneous operation wherein one button is mistakenly pushed instead of the other can be prevented.

In the interior of the vehicle 1, a control and operating section 16 for manually controlling the operation state of the vehicle head-up display 10 is provided. The control and operating section 16 has a display position control switch 17 for manually controlling the position of an image display area 10a on the front window 2, and a brightness control knob 18 for manually controlling the brightness of an image displayed in the image display area 10a.

The optical system of the vehicle head-up display 10 is provided in a lower area of the front window 2. As shown in FIG. 5, the optical system comprises a light source 21, an infrared-ray blocking glass plate 22 for blocking an infrared-ray portion included in rays (i.e., light) emitted from the light source 21, a liquid crystal panel 24, a diffusion plate 23 for diffusing light and irradiating the liquid crystal panel 24 with the diffused light, a plane mirror 25, and a concave mirror 26. In the optical system, light output from the light source 21 is radiated onto the liquid crystal panel 24, which is driven according to the image data to be displayed, and the image on the liquid crystal panel 24 is enlarged and projected onto the image display area 10a of the front window 2 via the plane mirror 25 and the concave mirror 26.

Typically, the vehicle head-up display 10 comprises an HUD (i.e., head-up display) control section 31, an HUD body 32, a night vision unit 33, a peripheral vehicle recognizing unit 34, and a headlight and small-light switch 35, as shown in FIG. 6.

The HUD control section 31, for example, detects motion of a target object in the vicinity of the driving vehicle 1, determines the possibility of a collision with the vehicle 1, and controls the HUD body based on the determined results, so as to display a warning image (for warning the driver) on the image display area 10a on the front window 2, and to control the brightness.

Therefore, a plurality of signals are input into the HUD control section 31, such as (i) an image signal and control signal from the night vision unit 33, (ii) an alarm signal for warning about the existence of peripheral vehicles which is output from the peripheral vehicle recognizing unit 34, (iii) a signal for indicating the ON/OFF state of a headlight or small light (not shown) which is output from the headlight and small-light switch 35, (iv) a control signal for controlling the display position of the image display area 10a which is output from the control and operating section 16, and (v) a control signal for controlling the brightness of a reference image, which is shown in advance on the image display area 10a.

The night vision unit 33 detects the distance between a target object and the vehicle 1 based on a difference of images taken by the IR cameras 11R and 11L, that is, based on parallax.

Therefore, the night vision unit 33 typically includes (i) a relative position detecting section for detecting the relative position of the target object with respect to the vehicle 1 as positional data, based on images taken by the IR cameras 11R and 11L, (ii) a movement vector calculating section for calculating the position of the target object in an actual space based on a plurality of time-series position data detected by the relative position detecting section, and for calculating a relative movement vector between the target object and the vehicle 1 based on the calculated position in the actual space, and (iii) a determination section for determining an object having a high possibility of collision with the vehicle 1 based on the relative movement vector.

The original images taken by the IR cameras 11R and 11L are processed according to a predetermined procedure including A/D conversion or the like, and image data generated using one or both of the original images is output as an image signal to the HUD control section 31. In this case, the predetermined procedure performed on the images taken by the IR cameras 11R and 11L, such as conversion or image-processing, is not limited. For example, the brightness of the object having a high possibility for collision with the vehicle 1 may be increased, so as to emphasize the object in the displayed image.

In addition, depending on the determined results by the determination section, if an object having a high possibility for collision with the vehicle 1 is determined, a control signal including an alarm signal is output to the HUD control section 31.

Furthermore, an ON/OFF (i.e., start/stop) signal from the display start/stop operating section 12 is input into the night vision unit 33, and therefore, the control signal output to the HUD control section 31 includes a signal for controlling the display starting and stopping timing, in addition to an alarm signal.

The peripheral vehicle recognizing unit 34 includes an inter-vehicle wireless communication device 34a for performing communication between driving vehicles and for exchanging vehicle data such as the driving state of each vehicle. More specifically, the inter-vehicle wireless communication device 34a sends a wireless signal including a data signal about the present vehicle (i.e., vehicle 1) to another vehicle in the vicinity of the vehicle 1, and simultaneously receives a wireless signal including a data signal about the other vehicle in the vicinity of the vehicle 1. The inter-vehicle wireless communication device 34a analyzes the data signal of the other vehicle, and informs the driver or passenger of the vehicle 1 of information necessary for the driving of the vehicle 1.

For example, the peripheral vehicle recognizing unit 34 determines whether an estimated driving locus of the present vehicle intersects with an estimated driving locus of the other vehicle, based on the received data signal of the other vehicle. If the peripheral vehicle recognizing unit 34 determines that the estimated driving loci intersect with each other, the peripheral vehicle recognizing unit 34 outputs an alarm signal related to the other vehicle to the HUD control section 31.

The headlight and small-light switch 35 is manually operated by the driver or the like, and the switch 35 outputs a signal indicating the ON/OFF state of a headlight or small light (not shown) to the HUD control section 31. Accordingly, as explained below, daytime and nighttime are distinguished so that the HUD control section 31 performs control suitable for each time period.

The HUD control section 31 comprises an operating section 36, a display control section 37, and a warning still-image data storage section 38.

Based on a control signal from the night vision unit 33, an alarm signal from the peripheral vehicle recognizing unit 34, and a signal indicating the ON/OFF state of the headlight or small light from the headlight and small-light switch 35, the operating section 36 calculates a command value for controlling the brightness to be output to the display control section 37, where the command value is used when an image corresponding to an image signal output from the night vision unit 33 or to a warning still image stored in the warning still-image data storage section 38 is displayed on the image display area 10a.

Based on the command value output from the operating section 36 and the signal for manually controlling the display position and the brightness output from the control and operating section 16, the display control section 37 outputs a control signal used for displaying an image corresponding to the image signal and the warning still image to the display section 39 provided in the HUD body 32.

Additionally, in the warning still-image data storage section 38, data of a predetermined warning still image is stored, which is retrieved by the display control section 37 according to an alarm signal from the peripheral vehicle recognizing unit 34.

Typically, the source voltage supply section 40A for the light source 21 (which is provided in the display section 39 of the HUD body 32) comprises a DC (direct current) source 40, and a boosting circuit including a DC-DC converter and the like, as shown in FIG. 7. A source voltage VB supplied by the DC source 40 is boosted up by a booster circuit 41 to a predetermined applied voltage V which is supplied to the light source 21.

Also, typically, the display control section 37 comprises a driver 42 and a switching element 43 which is formed using a MOSFET, IGBT, and the like.

The driver 42 performs the ON/OFF switching operation of the switching element 43, based on a command value related to the brightness supplied from the operating section 36, and a signal (for manually controlling the brightness) output from the control and operating section 16.

That is, the display control section 37 controls the applied voltage V supplied to the light source 21, by using, for example, the PWM (pulse width modulation) method, and the driver 42 controls the switching element 43 by outputting a drive voltage using a specific pulse sequence consisting of low and high levels, as shown in FIG. 8A. Accordingly, an applied voltage having a pulse sequence as shown in FIG. 8B is supplied to the light source 21, and the effective voltage of the applied voltage is controlled depending on a variation of the pulse sequence output from the driver 42, so that the brightness of the image displayed in the image display area 10a is controlled.

Below, an embodiment of the operation of the vehicle head-up display 10 having the above-explained structure, in particular, the process of controlling the brightness of the image displayed in the image display area 10a, will be explained with reference to the drawings.

Figure 9:
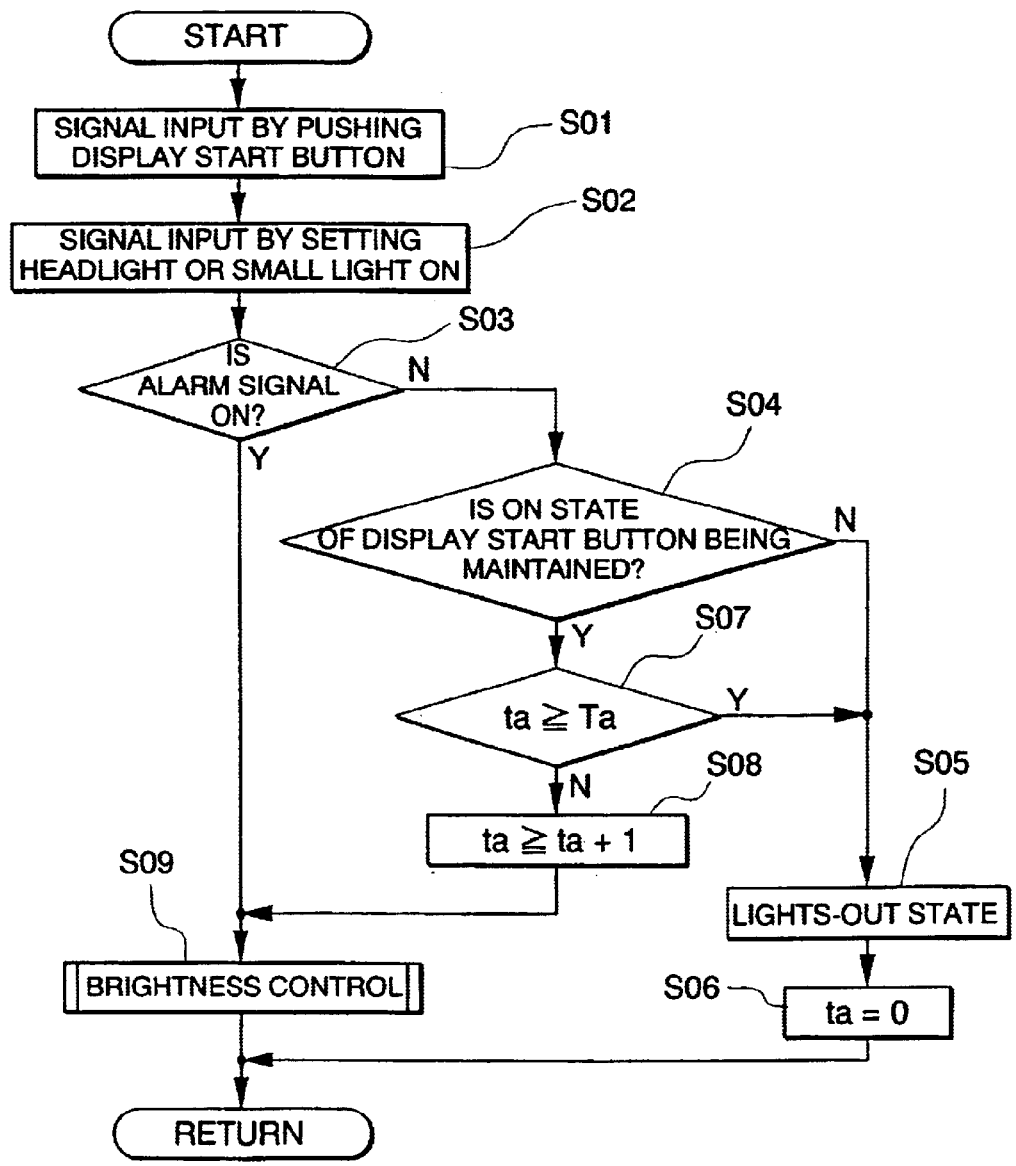
FIG. 9 is a flowchart showing an embodiment of the operation of the vehicle head-up display.
Figure 10:
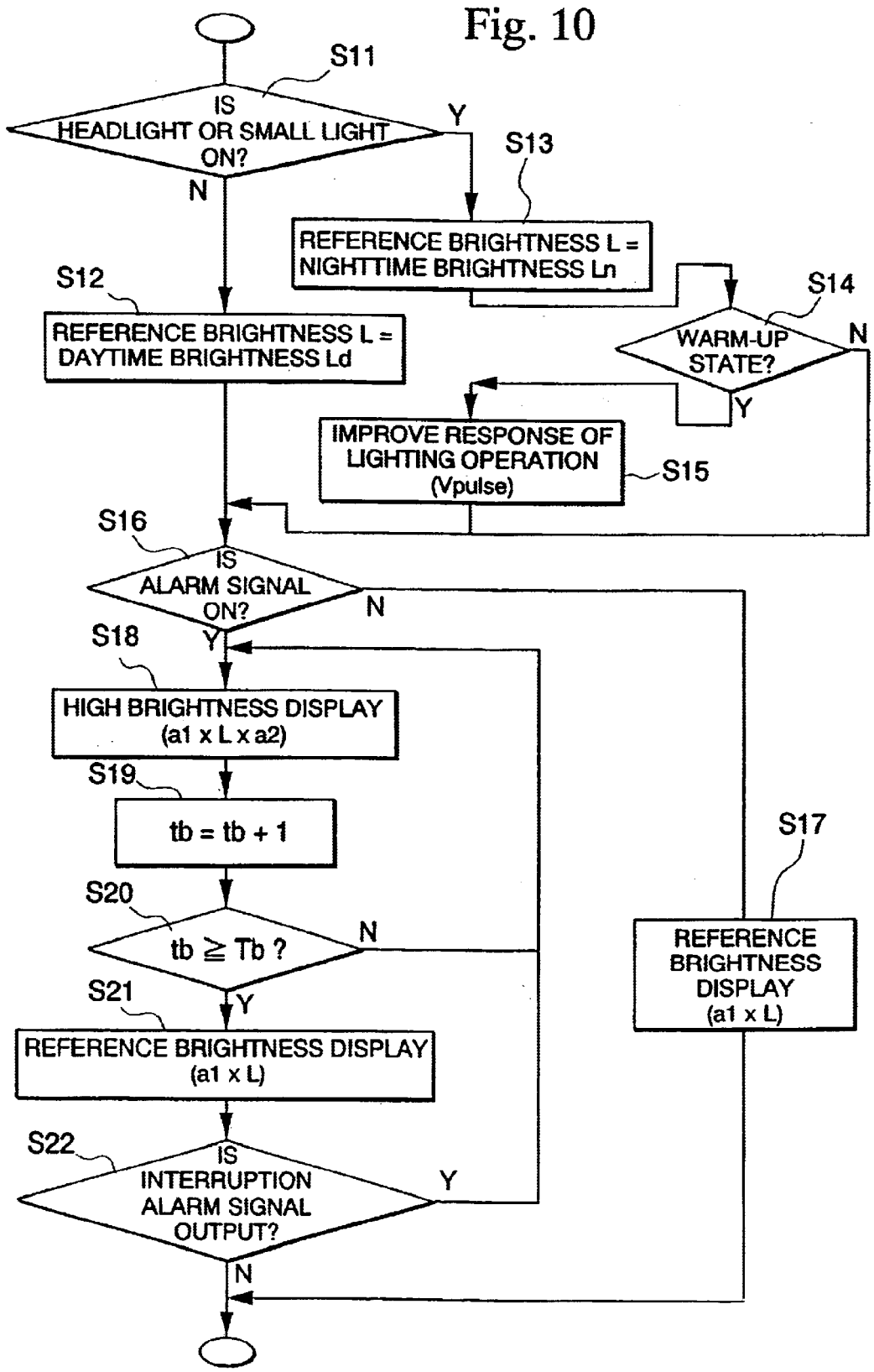
FIG. 10 is a flowchart showing an embodiment of the process of brightness control in FIG. 9.
Figure 11:
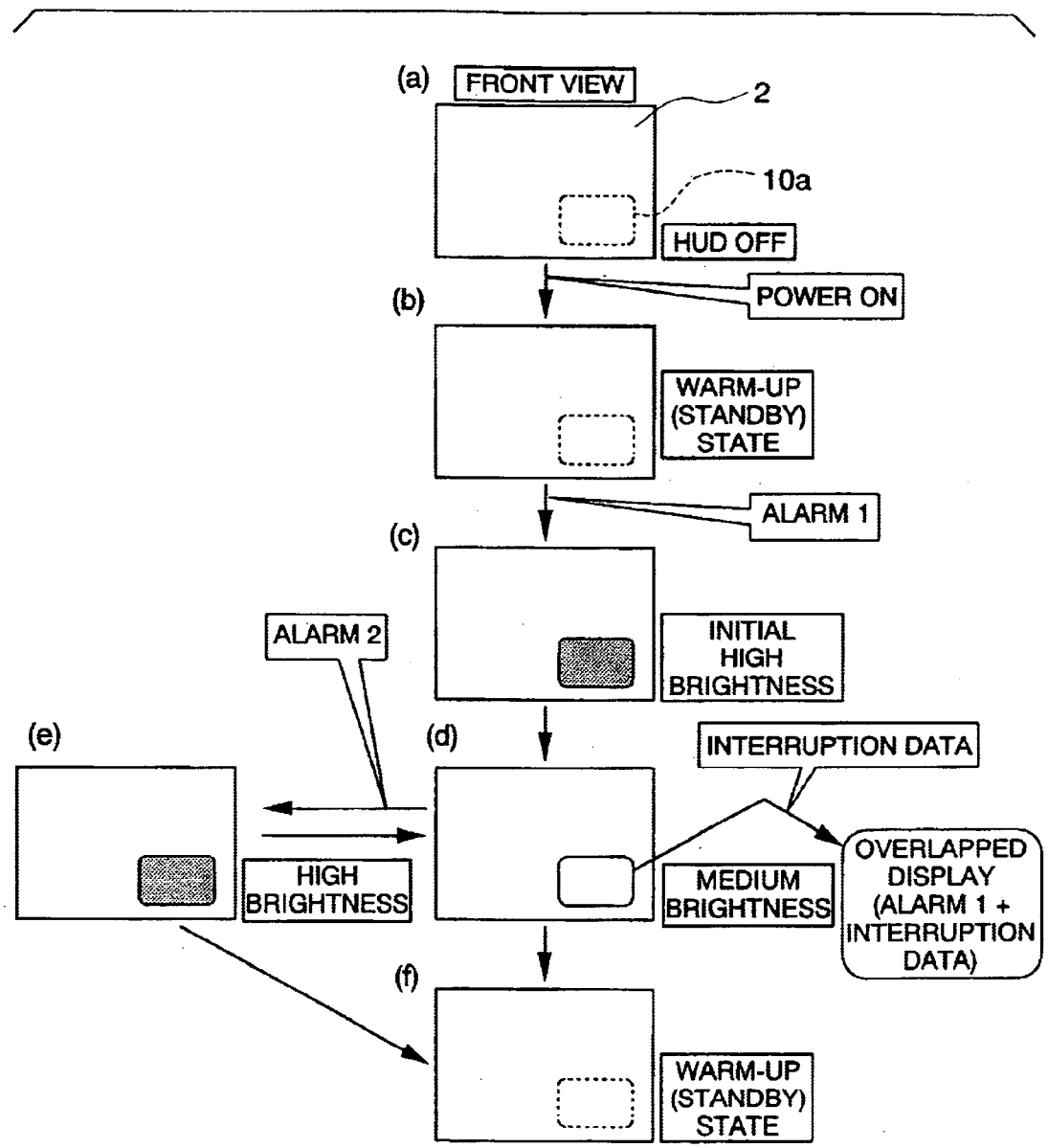
FIG. 11 is a diagram showing a variation of the image displayed on the front window during the operation of the vehicle head-up display.
Figure 12:
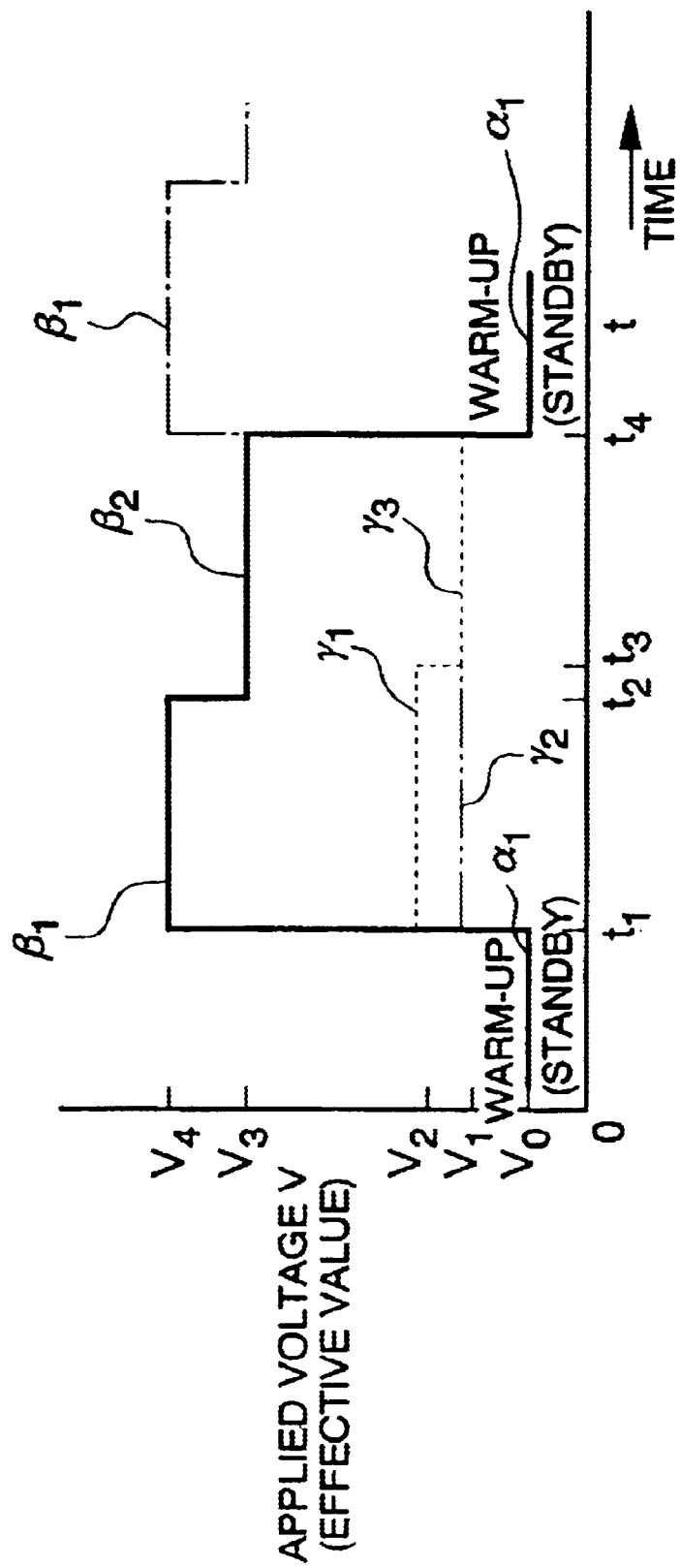
FIG. 12 is a graph showing a variation of the applied voltage V supplied to the light source provided in the display section of a HUD body.
Figure 13:
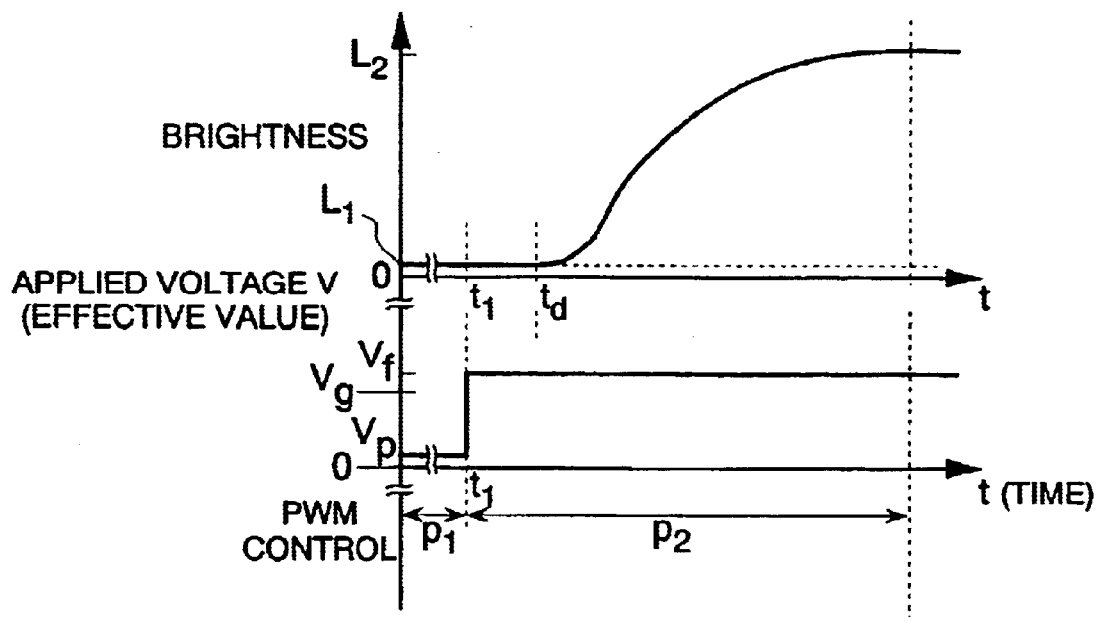
FIG. 13 is a graph showing the state of the PWM control by the display control section, a variation of the applied voltage V supplied to the light source, and a variation of the brightness of the displayed image during daytime operation.
Figure 14:
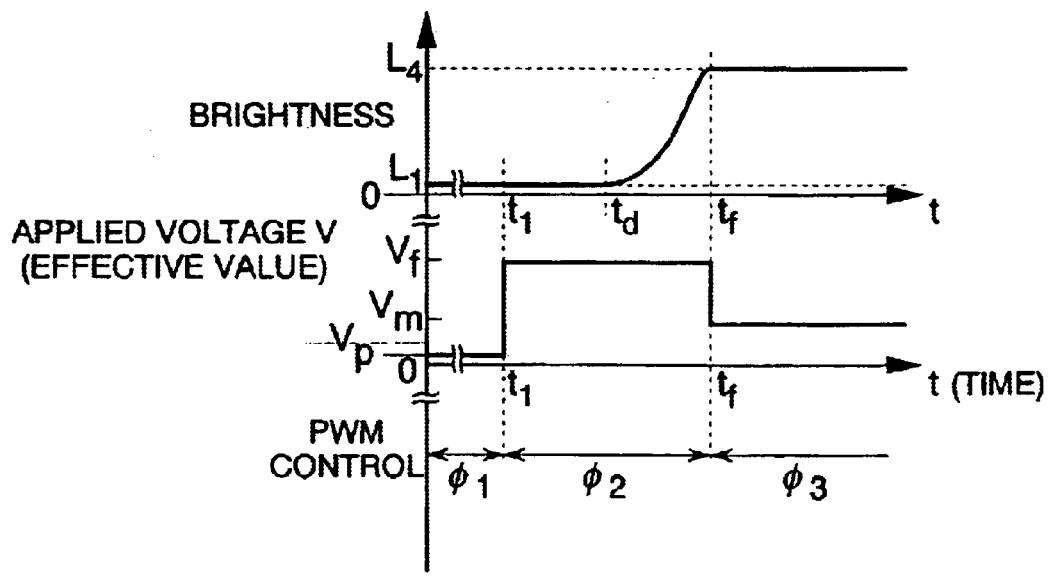
FIG. 14 is a graph showing the state of the PWM control by the display control section, a variation of the applied voltage V supplied to the light source, and a variation of the brightness of the displayed image during nighttime operation.
Figure 15A:
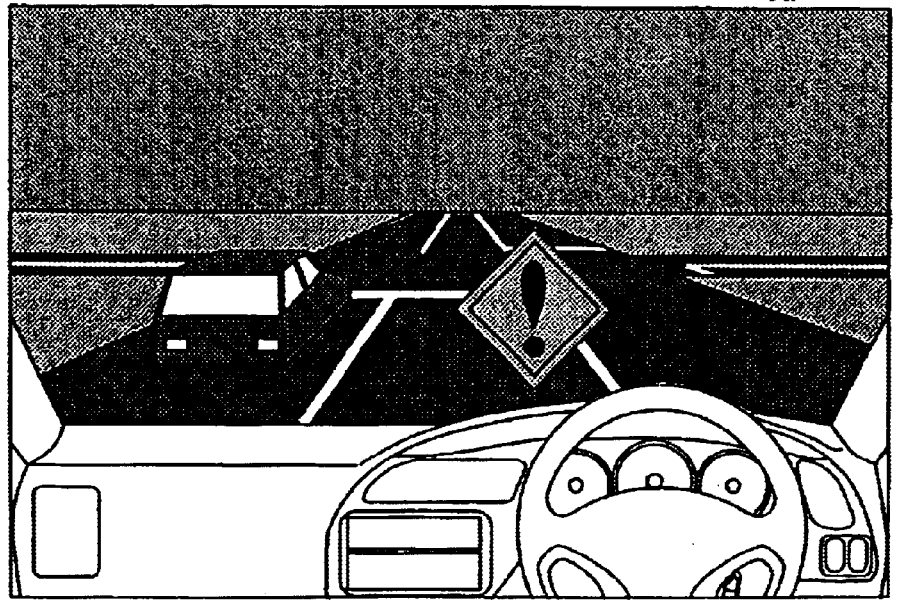
FIGS. 15A and 15B are views in which an image corresponding to warning still-image data is displayed.
Figure 15B:
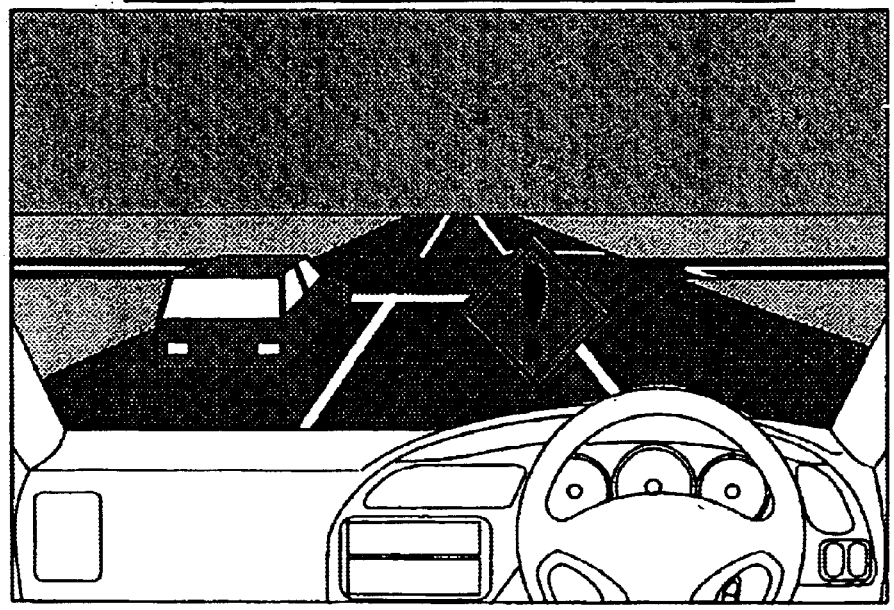

FIG. 9 is a flowchart showing an embodiment of the operation of the vehicle head-up display 10. FIG. 10 is a flowchart showing an embodiment of the process of brightness control in FIG. 9. FIG. 11 is a diagram showing a variation of the image displayed on the front window 2 during the operation of the vehicle head-up display 10. FIG. 12 is a graph showing a variation of the applied voltage V supplied to the light source 21 provided in the display section 39 of the HUD body 32. FIG. 13 is a graph showing the state of the PWM control by the display control section 37, a variation of the applied voltage V supplied to the light source 21, and a variation of the brightness of the displayed image during daytime operation. FIG. 14 is a graph showing the state of the PWM control by the display control section 37, a variation of the applied voltage V supplied to the light source 21, and a variation of the brightness of the displayed image during nighttime operation. FIGS. 15A and 15B are views in which an image corresponding to warning still-image data is displayed. FIGS. 16A to 16C are views showing steps of displaying each image using an image signal and/or warning still-image data, that is, a variation of the displayed image.

Regarding the starting conditions relating to the flowchart shown in FIG. 9, typically, the vehicle head-up display 10 is activated when the vehicle 1 is started by switching on the ignition, and the supply of the applied voltage V to the light source 21 of the HUD body 32 is started.

Accordingly, the vehicle head-up display 10 is shifted from the off state (see part (a) of FIG. 11) to the warm-up (i.e., standby) state (see part (b) of FIG. 11). Here, in this warm-up state, the driver or passenger of the vehicle 1 cannot see any image in the image display area 10a, as shown in part (b) of FIG. 11. In this state, a relatively low applied voltage $V_0$ is supplied to the light source 21 of the HUD body 32, as shown by the solid line indicated by reference symbol $\alpha_1$ in FIG. 12.

In step S01 of FIG. 9, if the driver or passenger of the vehicle 1 manually pushes the display start button 13 of the display start/stop operating section 12 (i.e., the relevant switch is on), a relevant input signal is generated.

In the next step S02, if the driver or passenger of the vehicle 1 manually sets the headlight or small light on, a relevant input signal is generated.

In the following step S03, it is determined whether a control signal including an alarm signal is output from the night vision unit 33, or whether an alarm signal is output from the peripheral vehicle recognizing unit 34.

If the result of the determination is "YES" (i.e., "Y" in the flowchart), the steps from step S09 (explained below) are performed, while if the result of the determination is "NO" (i.e., "N" in the flowchart), the operation proceeds to step S04. In step S04, it is determined whether the ON state of the display start button 13, which has been manually set on by the driver or passenger of the vehicle 1, is being maintained.

If the result of the determination in step S04 is "NO", the operation proceeds to step S05, where the image display area 10a of the front window 2 is set to a lights-out state by employing a relatively low effective voltage of the applied voltage V (for the light source 21 of the HUD body 32), as shown by the solid line indicated by reference symbol $\alpha_1$ in FIG. 12. In this case, the driver or passenger of the vehicle 1 cannot discern any image in the image display area 10a, that is, the warm-up state as shown in part (f) of FIG. 11 is employed.

In the next step S06, a timer value "ta" of a manual activation timer (i.e., provided for manual activation) is set to 0, that is, the present state is reset and the operation is completed.

If the result of the determination in step S04 is "YES", the operation proceeds to step S07, where it is determined whether the timer value "ta" of the manual activation timer is equal to or above a predetermined timer value Ta.

If the result of the determination in step S07 is "YES", the steps from step S05 are performed, while if the result of the determination in step S07 is "NO", the timer value "ta" for the manual activation is updated to a new timer value "ta" obtained by adding a value of 1 to the previous timer value "ta", and the operation proceeds to step S09.

In step S09, the process for controlling the brightness explained below is performed, and the operation is completed.

Below, the process for controlling the brightness (i.e., "brightness control" in step S09) will be explained with reference to the drawings.

First, in step S11 in FIG. 10, it is determined whether the headlight or small light is on.

If the result of the determination is "NO", that is, if it is determined that the current time period is daytime, then the operation proceeds to step S12, where the reference brightness L is set to a daytime brightness Ld (i.e., suitable for daytime), and the operation proceeds to step S16 explained below.

On the other hand, if the result of the determination in step S11 is "YES", that is, if it is determined that the current time period is nighttime, then the operation proceeds to step S13, where the reference brightness L is set to a nighttime brightness Ln (i.e., suitable for nighttime), and the operation proceeds to step S14.

In step S14, it is determined whether the current state is the warm-up state, that is, in the standby mode. If the result of the determination is "YES", then the operation proceeds to step S15, while if the result of the determination is "NO", then the steps from step S16 are performed.

At night, if a voltage corresponding to the nighttime brightness Ln is simply employed, it takes a considerable time to reach the nighttime brightness Ln from the warm-up state, as explained below. Therefore, in step S15, in the initial lighting step from the warm-up state, the duty ratio in the PWM method is set to 100% and a relevant number of pulses are output by the display control section 37, so as to supply an applied voltage $V_{pulse}$ to the light source 21 of the HUD body 32. Accordingly, the response of the lighting operation can be improved. The operation of brightness control then proceeds to step S16.

In step S16, it is determined whether a control signal including an alarm signal is output from the night vision unit 33, or whether an alarm signal is output from the peripheral vehicle recognizing unit 34.

If the result of the determination is "NO", then the operation proceeds to step S17, where a reference brightness display operation is performed, and the process of the flowchart of FIG. 9 is completed. In the reference brightness display operation, given a predetermined coefficient al provided for this operation, an applied voltage V=al×L is supplied to the light source 21, and an image corresponding to an image signal output from the night vision unit 33 or the like is displayed on the image display area 10a of the front window. As explained in detail below, at night, the applied voltage $V_{pulse}$ is supplied to the light source 21 in the above-explained step S15 until the brightness of the activated light source 21 reaches a predetermined target brightness, and then in the steps from step S16, the applied voltage V is supplied.

If the result of the determination in step S16 is "YES", then the operation proceeds to step S18, where a high brightness display operation is performed. That is, given a predetermined coefficient a2 provided for the high brightness display operation, an applied voltage V=al×L×a2 is supplied to the light source 21.

Accordingly, as shown in part (c) of FIG. 11, an image corresponding to an image signal output from the night vision unit 33 is displayed with relatively high brightness on the image display area 10a of the front window 2. That is, during the day, an applied voltage $V_4$ having a relatively high brightness suitable for daytime is supplied to the light source 21, as shown by the solid line indicated by reference symbol $\beta_1$ in FIG. 12.

On the other hand, at night, an applied voltage $V_2$ having a relatively high brightness suitable for nighttime is supplied to the light source 21, as shown by the dotted line indicated by reference symbol $\gamma_1$ in FIG. 12.

Here, the applied voltages $V_2$ and $V_4$ have the relationship $V_2 < V_4$, so that during the day, a brightness for preventing an invisible state due to outdoor daylight or the like is maintained, while at night, the brightness is reduced so as to prevent a blinding state due to excessive brightness.

In the next step S19, a timer value "tb" of a high brightness display timer is updated to a new timer value "tb" obtained by adding a value of 1 to the previous timer value "tb".

In the following step S20, it is determined whether the timer value "tb" of the high brightness display timer is equal to or above a predetermined timer value Tb. If the result of the determination is "NO", then the operation proceeds to the above-explained step S18. On the other hand, if the result of the determination is "YES", then the operation proceeds to step S21, and an applied voltage V=al×L is supplied to the light source 21, so as to perform a reference (medium) brightness display operation, as shown in part (d) in FIG. 11.

That is, during the day, an applied voltage $V_3$ lower than that used in the high brightness display operation (i.e., $V_3 < V_4$) is supplied to the light source 21, as shown by the solid line indicated by reference symbol $\beta_2$ in FIG. 12. On the other hand, in nighttime, an applied voltage $V_1$ lower than that used in the high brightness display operation (i.e., $V_1 < V_2$) is supplied to the light source 21, as shown by the dotted line indicated by reference symbol $\gamma_3$ in FIG. 12.

In FIG. 12, the applied voltages $V_0, V_1, \ldots, V_4$ have the relationship $V_0 < V_1 < V_2 < V_3 < V_4$.

In the following step S22, it is determined whether an interruption alarm signal or an additional display command signal is output, for example, whether an alarm signal or the like is output from the peripheral vehicle recognizing unit 34.

If the result of the determination is "YES", then the operation proceeds to step S18, where a high brightness display operation is performed, as shown in part (e) of FIG. 11 and shown by the alternate long and short dashed line indicated by reference symbol $\beta_1$ in FIG. 12. If an additional display designation signal is output, for example, if an alarm signal or the like is output from the peripheral vehicle recognizing unit 34, then an image corresponding to a warning still-image data in response to the alarm signal (or the like) is superimposed on the image corresponding to the usual image signal.

On the other hand, if the result of the determination in step S22 is "NO", the operation brightness control is completed.

Below, the process for improving the response of the lighting operation in the above-explained step S15 will be explained in more detail with reference to FIGS. 13 and 14.

When the driver switches on the ignition and the vehicle 1 is started, the duty ratio in the PWM control performed by the display control section 37 is set to a predetermined small value (e.g., approximately 2%) so as to obtain a warm-up state, as shown in the time period indicated by reference symbol pi in FIG. 13 and the time period indicated by reference symbol $\phi_1$ in FIG. 14.

Accordingly, a relatively weak applied voltage $V_p$ is supplied to the light source 21, so that an image having a relatively low brightness $L_1$ is displayed on the image display area 10a of the front window 2. With this determined brightness $L_1$, the driver or passenger of the vehicle 1 cannot discern a displayed image.

During the day, if the driver or passenger pushes the display start button 13 of the display start/stop operating section 12 (i.e., manually switches the button switch on), or if a control signal including an alarm signal from the night vision unit 33 or an alarm signal from the peripheral vehicle recognizing unit 34 is output (i.e., time $t_1$), then the duty ratio in the PWM control performed by the display control section 37 is set to 100% so as to obtain a fully-used or driven state, as shown in the time period indicated by reference symbol $\rho_2$ in FIG. 13. Accordingly, the maximum applied voltage $V_f$ to be output is supplied to the light source 21, so that the light source 21 obtains a target brightness.

Typically, the target brightness during the day is set to the maximum brightness $L_2$, that is, the maximum brightness which the light source 21 can obtain or output. After the light source 21 reaches the target brightness $L_2$ and a predetermined time N has elapsed from the lighting start time of the light source 21, the applied voltage is reduced, for example, from $V_f$ to $V_g$ (i.e., $V_f > V_g$) so as to switch the display state from the high brightness state to the reference (or medium) brightness state.

On the other hand, at night, when the driver or passenger pushes the display start button 13 of the display start/stop operating section 12 (i.e., manually switches the button switch on), or when a control signal including an alarm signal from the night vision unit 33 or an alarm signal from the peripheral vehicle recognizing unit 34 is output (i.e., time $t_1$), then the duty ratio in the PWM control performed by the display control section 37 is set to 100% for a predetermined time ($t_f - t_1$) so as to obtain a fully-used or driven state, as shown in the time period indicated by reference symbol $\phi_2$ in FIG. 14. Accordingly, the maximum applied voltage $V_f$ to be output is supplied to the light source 21. That is, control for improving the response of the lighting operation is performed for the predetermined time during which the applied voltage $V_f$ is supplied (refer to step S15 in FIG. 10), so that the time necessary for the light source 21 to reach the target brightness at night ($L_4$) can be reduced.

Typically, the above time ($t_f - t_1$) is predetermined according to the characteristics of the light source 21, and is equal to the time necessary for the light source 21 to reach the target brightness at night ($L_4$) when the duty ratio in the PWM control performed by the display control section 37 is set to 100%.

When the brightness of the light source 21 reaches the target brightness $L_4$, the applied voltage is reduced, for example, from $V_f$ to $V_m$, as shown in the time period indicated by reference symbol $\phi_3$ in FIG. 14. Accordingly, the reference brightness of the light source 21 (here, $L_4$) is maintained by the applied voltage $V_m$.

If there is an alarm (data), the applied voltage is changed from $V_m$ to $V_n$ ($V_n > V_m$) so as to change the display state from the reference brightness state to the high brightness state.

Below, the display state (in the image display area 10a on the front window 2) of an image corresponding to an image signal output from the night vision unit 33, and/or still-image data stored in the warning still-image data storage section 38 will be explained with reference to FIGS. 15A to 16C.

If an alarm signal is output from the peripheral vehicle recognizing unit 34 during the day, an image corresponding to the still-image data defined for the alarm signal is displayed with a high brightness for a predetermined time, as shown in FIG. 15A (here, an exclamation mark). After the predetermined time has elapsed, the brightness for the still-image data is reduced from the high level to the reference level, so that the relevant image is displayed for another predetermined time with a reference brightness, as shown in FIG. 15B.

On the other hand, if a control signal including an alarm signal is output from the night vision unit 33 at night, an image corresponding to an image signal output from the night vision unit 33 is displayed with a high brightness for a predetermined time, as shown in FIG. 16A. In this case, if an image corresponding to the still-image data is displayed according to the alarm signal from the peripheral vehicle recognizing unit 34 (see FIG. 16B), an image corresponding to both the image signal and the still-image data defined for the alarm signal is displayed with a high brightness for a predetermined time, as shown in FIG. 16C.

As described above, the vehicle head-up display 10 of the present invention has the display start/stop operating section 12 for manually operating the timing of starting and stopping the display on the image display area 10a. Therefore, an image corresponding to an image signal output from the night vision unit 33 can be displayed according to, for example, the driver's intention. Therefore, the recognizable area in front of the vehicle 1 can be extended.

If a manual display-starting operation is performed by the driver, then it is determined that the driver intends to confirm a displayed image, and a brightness relatively lower than that employed in the image display due to an alarm signal is employed. Therefore, it is possible to provide a driving environment in consideration of both the front view and the image display state.

On the other hand, if a control signal including an alarm signal is output from the night vision unit 33, an image corresponding to an image signal output from the night vision unit 33 is displayed with a high brightness, while if an alarm signal is output form the peripheral vehicle recognizing unit 34, an image corresponding to warning still-image data defined for the alarm signal is displayed with a high brightness. Therefore, the driver and passenger(s) of the vehicle 1 do not miss the relevant alarm, and also do not erroneously specify an object which may collide with the vehicle 1; thus, the driver and passenger(s) can reliably recognize the alarm and the vehicle 1 can perform a suitable operation for avoiding such an object.

In addition, the high or reference brightness display of an image corresponding to an alarm signal or warning still-image data is performed only for a predetermined time after an alarm signal is output. Therefore, when an alarm is communicated, the driver or passenger's attention can be attracted much more easily in comparison with the other cases in which such a high or reference brightness display is always performed. In particular, at night, the driver or passenger can much more reliably recognize a communicated alarm.

Also in the above embodiment, the brightness set for displaying an image in the image display area 10a is changed according to the state of whether the headlight or small light is on, that is, according to the time period such as daytime and nighttime. During the day, a relatively high brightness is maintained for preventing an invisible state due to outdoor daylight or the like, while at night, the brightness is reduced so as to prevent a blinding state due to excessive brightness. Therefore, an alarm can be reliably communicated to the driver or passenger, and simultaneously, the driver's vision is not unnecessarily stimulated.

When no alarm signal is output or no manual operation for starting the display is performed, the light source 21 is maintained in the warm-up state, in which a (relatively) very low applied voltage is supplied to the light source 21. Therefore, no image which obstructs the driver's vision is displayed on the front window 2.

Additionally, as the warm-up state is maintained, when an alarm signal is output or a manual operation for starting the display is performed, the brightness of the displayed area can be quickly increased, thereby improving the response of the light source 21.

Furthermore, even if the target brightness of an image (displayed when an alarm signal is output or a manual operation for starting the display is performed) is set to a relatively low value, for example, at night, the duty ratio in the PWM control performed by the display control section 37 is set to 100% so as to obtain a fully-used or driven state.

Therefore, the response of the light source 21 at the display start time can be much more improved. Accordingly, the time necessary for the driver or passenger to recognize the relevant alarm can be reduced.

In the above embodiment, the shift timing from the high brightness state to the reference brightness state is when the timer value "tb" of the high brightness display timer becomes equal to or above the predetermined timer value Tb. However, this condition is not limited. For example, the shift timing during the day may differ from the shift timing at night, as shown in FIG. 12. That is, in FIG. 12, the duration of the high brightness state during the day is $t_2-t_1$, while the duration of the high brightness state at night is $t_3-t_1$.

Although there have been described what are the present embodiments of the invention, persons skilled in the art will understand that changes and variations may be made thereto without departing from the gist, spirit or essence of the invention. The scope of the invention is set forth in the appended claims.

What is claimed is:

1. A head-up display on a vehicle, comprising:
   an image display device for displaying an image taken by a camera built into the vehicle such that the image is visible to a vehicle occupant looking toward a windscreen of the vehicle;
   a detecting device for detecting a target object in the vicinity of the vehicle;
   a switching device for manually switching between a display state in which the image is displayed by the image display device and a warm-up state in which the image is invisible; and
   a warning device for outputting a control signal based on a result detected by the detecting device, thereby making the image display device display the image,
   wherein the brightness employed by the image display device for displaying the image according to the control signal is higher than the brightness employed by the image display device for displaying the image according to a manual operation of the switching device;
   in the warm-up state, the image is displayed with a brightness by which the image is invisible to the driver or passenger of the vehicle; and
   when a predetermined time has elapsed after the image display device starts to display the image, the display state is shifted to the warm-up state.

2. A head-up display as claimed in claim 1, wherein when the image display device displays the image according to the control signal from the warning device, the image display device reduces the brightness after a predetermined time from the starting of the display.

3. A head-up display as claimed in claim 1, wherein the image display device has a light source for changing the brightness of the displayed image according to an applied voltage supplied to the light source; and
   when the image display device is commanded to display the image by a manual operation of the switching device or the control signal output from the warning device, the image display device supplies the maximum applied voltage to be applied to the light source for a predetermined time.

4. A head-up display as claimed in claim 1, wherein the detecting device outputs an alarm signal when detecting a target object in the vicinity of the vehicle; and
   image display device displays a predetermined still image according to the alarm signal output from the detecting device, and
   wherein the brightness employed by the image display device for displaying the still image according to the alarm signal is higher than the brightness employed by the image display device for displaying the image according to a manual operation of the switching device.

5. A head-up display as claimed in claim 4, wherein when the image display device displays the still image according to the alarm signal from the detecting device, the image display device reduces the brightness after a predetermined time from the starting of the display.

6. A head-up display as claimed in claim 4, wherein when both the control signal from the warning device and the alarm signal from the detecting device are output, the image display device displays the image taken by the camera and the still image which are overlapped.

7. A head-up display on a vehicle, comprising:
   an image display device for displaying an image taken by a camera built into the vehicle such that the image is visible to a vehicle occupant looking toward a windscreen of the vehicle;
   a detecting device for detecting a target object in the vicinity of the vehicle;
   a switching device for manually switching between a display state in which the image is displayed by the image display device and a warm-up state in which the image is invisible; and
   a warning device for outputting a control signal based on a result detected by the detecting device, thereby making the image display device display the image;
   wherein the brightness employed by the image display device for displaying the image according to the control signal is higher than the brightness employed by the image display device for displaying the image according to a manual operation of the switching device;
   the image display device has a light source for changing the brightness of the displayed image according to an applied voltage supplied to the light source;
   when the image display device is commanded to display the image by a manual operation of the switching device or the control signal output from the warning device, the image display device supplies the maximum applied voltage to be applied to the light source for a predetermined time; and
   after the image display device supplies the maximum applied voltage to be applied to the light source for the predetermined time, the image display device reduces the voltage supplied to the light source to either a level corresponding to a high brightness image display when the image display device is commanded to display the image by the control signal output from the warning device or a level corresponding to a lesser brightness image display when the image display device is commanded to display the image by the manual operation of the switching device.

* * * * *

UNITED STATES PATENT AND TRADEMARK OFFICE
CERTIFICATE OF CORRECTION

PATENT NO. : 6,720,938 B2
DATED : April 13, 2004
INVENTOR(S) : Ohkawara et al.

It is certified that error appears in the above-identified patent and that said Letters Patent is hereby corrected as shown below:

Column 10,
Line 42, change "symbol pi in FIG. 13" to -- symbol $\rho_1$ in FIG. 13 --.

Column 11,
Line 24, change "Typically[the above time" to -- Typically the above time--.

Signed and Sealed this

Thirteenth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,720,938 B2  
APPLICATION NO. : 09/850243  
DATED : April 13, 2004  
INVENTOR(S) : Ohkawara et al.

Page 1 of 1

It is certified that error appears in the above-identified patent and that said Letters Patent is hereby corrected as shown below:

Title page:
In item (54) and col. 1, lines 1-3, the title, change "WARNING LIGHT" to --WARNING IMAGE-- because there was an inexplicable typing error on the application data sheet that the rest of the application papers do not support, and which was never corrected.
In the left illustrative figure, in box S08, change "ta $\geq$ ta + 1" to --ta = ta + 1--.

Drawings:
Sheet 6 of 12, Fig. 9, in box S08, change "ta $\geq$ ta + 1" to --ta = ta + 1--.
Sheet 10 of 12, FIG. 13, change "$p_1$" to --$\rho_1$-- and change "$p_2$" to --$\rho_2$--.

Column 1:
Line 3, change "LIGHT" to --IMAGE-- for the same reason that the title is wrong on the title page.
Line 54, change "33 (which" to --33, which--.
Line 55, change "device) in" to --device, in--.

Column 10:
Line 43, change "symbol pi" to --symbol $\rho_1$--.

Column 11:
Line 24, change "Typically ⊏the" to --Typically, the--.

Column 12:
Line 20, change "output form" to --output from--.

Column 14:
Line 4, change "image display device" to --the image display device--.

Signed and Sealed this

Thirteenth Day of April, 2010

David J. Kappos
*Director of the United States Patent and Trademark Office*